United States Patent
Huang et al.

(10) Patent No.: US 7,827,076 B2
(45) Date of Patent: Nov. 2, 2010

(54) METHOD AND SYSTEM OF MATCHING CUSTOMER DEMAND WITH PRODUCTION CAPACITY

(75) Inventors: Chi-Jung Huang, Changhua (TW); Fa-Liang Wang, Hsinchu (TW); Chung-I Liu, Taipei (TW); Ching-I Yeh, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1489 days.

(21) Appl. No.: 10/646,141

(22) Filed: Aug. 22, 2003

(65) Prior Publication Data

US 2005/0044012 A1    Feb. 24, 2005

(51) Int. Cl.
*G06Q 10/00* (2006.01)
(52) U.S. Cl. ................................................ 705/28
(58) Field of Classification Search .................. 705/28
See application file for complete search history.

(56) References Cited

U.S. PATENT DOCUMENTS

| | | | |
|---|---|---|---|
| 5,537,313 A * | 7/1996 | Pirelli | 705/28 |
| 5,971,585 A | 10/1999 | Dangat et al. | |
| 6,324,520 B1 * | 11/2001 | Walker et al. | 705/16 |
| 6,751,525 B1 * | 6/2004 | Crisp, III | 700/241 |
| 6,925,447 B2 * | 8/2005 | McMenimen et al. | 705/28 |
| 6,937,992 B1 * | 8/2005 | Benda et al. | 705/7 |
| 7,006,981 B2 * | 2/2006 | Rose et al. | 705/10 |
| 7,212,976 B2 * | 5/2007 | Scheer | 705/1 |
| 7,240,027 B2 * | 7/2007 | McConnell et al. | 705/28 |
| 7,249,068 B1 * | 7/2007 | Kakouros et al. | 705/28 |
| 7,257,552 B1 * | 8/2007 | Franco | 705/28 |
| 7,370,005 B1 * | 5/2008 | Ham et al. | 705/26 |
| 2001/0020230 A1 * | 9/2001 | Kaneko et al. | 705/8 |
| 2001/0047293 A1 * | 11/2001 | Waller et al. | 705/10 |
| 2002/0046125 A1 * | 4/2002 | Speicher et al. | 705/22 |
| 2002/0188499 A1 * | 12/2002 | Jenkins et al. | 705/10 |

FOREIGN PATENT DOCUMENTS

| | | |
|---|---|---|
| EP | 1154359 | 11/2001 |
| JP | 08286724 | 11/1996 |
| WO | WO02054176 | 7/2002 |

OTHER PUBLICATIONS

Goodale, John C "A Market Utility-Based Model for Capacity Scheduling in Mass Services" Production & Operations Management, Summer 2003 v.12 n.2, pp. 165-185.*
Singapore Office Action mailed Sep. 27, 2006.

* cited by examiner

*Primary Examiner*—Matthew S Gart
*Assistant Examiner*—Oluseye Iwarere
(74) *Attorney, Agent, or Firm*—Thomas, Kayden, Horstemeyer & Risley (57) ABSTRACT

A method of matching customer demand with production capacity of a plurality of factory facilities. The inventive method includes inputting demand data and supply data, performing a first matching operation, collecting rematched demand data and rematched supply data, classifying the rematched demand data, and performing a second matching operation.

33 Claims, 5 Drawing Sheets

METHOD AND SYSTEM OF MATCHING CUSTOMER DEMAND WITH PRODUCTION CAPACITY

BACKGROUND OF THE INVENTION

1. Field of the Invention

The present invention relates to a demand-supply matching technology, and in particular to a computer-implemented method of matching customer demand with production capacity of a plurality of factory facilities.

2. Description of the Related Art

A commercial product must go through many different processes, such as design, manufacture, packaging, and distribution, all of which comprise considerable planning and scheduling. The manufacturing process is often complicated, especially in high technology fields such as IC manufacture, making effective supply chain management an important role.

One significant challenge for supply chain management is to maximize the demand-supply matching rate. In this regard, an effective demand-supply matching methodology utilizes the desired supply to satisfy customer demand as much as possible. It is relatively simple to match demand with desired supply with there is a one-to-one correspondence. However, in many cases, the demand and the desired supply are mismatched. Because of exceedingly high manufacturing costs, resolution of the demand-supply mismatching problem is extremely important for IC manufacturers.

There are known conventional approaches to the demand-supply mismatch problem. One is referred to as Linear Programming (LP). The main purpose of LP is to utilize "LP Boundary" constraints to optimize "Business Objectives" in terms of "given" sets of demand priorities and pre-selected supply directions. LP cannot effectively handle demand-supply mismatching problems directly because it is generally unable to distinguish between alternative solutions if there is no provided preferred or pre-defined demand pattern, thus creating difficulties for IC manufacturers needing a explicit decision for demand-supply matching.

Another conventional approach to the demand-supply mismatch problem is referred to as Material Requirement Planning (MRP). The main idea of MRP is to apply experiential rules to calculate and match demand with supply. Nevertheless, MRP logic is generally too simplistic to handle the demand-supply mismatching problems of high technology manufacturing that must consider multiple phases of demand and supply.

U.S. Pat. No. 6,272,389 discloses a method and system for capacity allocation in an assembly environment. The methods disclosed are not, however, suitable for high technology manufacturers, such as IC manufacturers.

SUMMARY OF THE INVENTION

Accordingly, an object of the invention is to provide a method of matching customer demand with production capacity of factory facilities. The inventive method matches customer demand with the production capacity of the factory facilities to obtain a high demand fulfillment rate and a high supply utilization rate, satisfying the customer and the manufacturer simultaneously.

To achieve foregoing and other objects, the invention is directed to novel systems and methods for overcoming conventional demand-supply mismatch problems. In one embodiment, the method matches customer demand with a manufacturer supply of products from plurality of factory facilities. The method first inputs demand data for a demand of at least one product requested by at least one customer and supply data corresponding to the production capacity of the factory facilities, then performs a first matching operation to match the demand data with the supply data to obtain a first demand-supply matching result. Thereafter, the method collects rematched demand data corresponding to a portion of the demand unsatisfied by the first matching operation from the demand data and collecting rematched supply data corresponding to a portion of the unused capacity in the first matching operation from the supply data. Then, the method classifies the rematched demand data into a plurality of classified demand data records according to at least one attribute of the corresponding products and customers, the classified demand data having different priorities. Finally, the method performs a second matching operation to match the classified demand data with the rematched supply data based on the priorities of the classified demand data to obtain a second demand-supply matching result.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

As summarized above, the present invention is directed to novel systems and methods for overcoming conventional demand-supply mismatch problems. In one embodiment, demand data for products requested by customers and supply data corresponding to the production capacity of the factory facilities are input. The demand data is preferably provided in a demand table. The demand table characterizes the relationship between customer demand, the factory facilities, and manufacturing processes for a product as provided thereby. The supply data is listed in a supply table. The supply table characterizes the relationship between the factory facilities, the capacity, and manufacturing processes provided by the factory facilities.

Afterward, a first matching operation, matching the demand data with the supply data, is performed, to obtain a first demand-supply matching result. After the first demand-supply matching result is obtained, the first demand-supply matching result is recorded and the demand data and the supply data are updated according thereto.

Rematched demand data and rematched supply data are then collected. The rematched demand data corresponds to a portion of the demand unsatisfied in the first matching operation from the demand data. The rematched supply data corresponds to a portion of the unused capacity in the first matching operation from the supply data.

The rematched demand data is listed in a rematched demand table that characterizes the relationship between unsatisfied demand, the factory facilities, and manufacturing processes for the product as provided thereby. The rematched supply data is listed in rematched supply tables. The rematched supply tables characterize the available factory facilities of the manufacturing processes, the manufacturer preferred factory facilities under cost consideration, the customer preferred factory facilities.

The rematched demand data is then classified into classified demand data according to attributes of the corresponding products and customers. The classified demand data has different priorities. Attributes include new customers and new manufacturing processes of the product, existing customers and new manufacturing processes of the product, and existing customers and existing manufacturing processes of the product.

Finally, a second matching operation, matching the classified demand data with the rematched supply data based on the priorities of the classified demand data, is performed to obtain a second demand-supply matching result. The second demand-supply matching result is recorded and the demand data and the supply data are updated according to the second demand-supply matching result.

For explanation, the second matching operation can be designed by certain of steps. First, auto simulated dummy matching demand-supply groups are generated. A demand-supply engine then produces a real demand-supply matching code from the auto simulated dummy matching demand-supply groups, thus accomplishing the optimized demand-supply matching.

In addition, the invention discloses a storage medium for storing a computer program providing a method of matching customer demand with production capacity of a plurality of factory facilities. The method includes the steps mentioned.

Furthermore, the invention discloses a system for matching customer demand with production capacity of a plurality of factory facilities. The system includes a match database, a rematch database, a customer interface, a factory interface, and a controller computer.

The match database stores demand data and supply data. The demand data corresponds to customers' product demand and the supply data corresponds to the production capacity of the factory facilities. The rematch database stores rematched demand data and rematched supply data. The customer interface enables input of the demand data and the factory interface enables input of the supply data.

The controller computer is coupled to the match database, the rematch database, the customer interface, and the factory interface, and performs a first matching operation, collects the rematched demand data and the rematched supply data, classifies the rematch data into classified demand data, and performs a second matching operation.

The first matching operation matches the demand data with the supply data to obtain a first demand-supply matching result. The controller computer then collects rematched demand data corresponding to the portion of the demand unsatisfied in the first matching operation from the demand data, and rematched supply data corresponding to a portion of the unused capacity in the first matching operation from the supply data.

The rematched demand data is classified into classified demand data according to attributes of the corresponding products and customers by the controller computer. The classified demand data has different priorities. The controller computer performs the second matching operation, matching the classified demand data with the rematched supply data, based on the priorities of the classified demand data to obtain a second demand-supply matching result.

Moreover, the invention discloses a system of demand and capacity management. The system includes an allocation planning module, a capacity model, and a capacity management module.

The allocation planning module receives demand data for customers' product demand and supply data corresponding to the production capacity of the factory facilities. The capacity model contains route information for the product, based on records of tools. The capacity management module reserves capacity according to the demand data and the route information.

The allocation planning module includes a data input module, a first match module, a rematch data collection module, a classification module, and a second match module. The allocation planning module performs the functions provided by the method mentioned.

The system can be applied to supply chain management of a manufacturer. The allocation planning module is the first part of the supply chain management. The allocation planning module handles the demand and matches the demand with the production capacity of the manufacturer. As an example, the demand data may be a demand plan of a fixed period from the customer. The matching result may be sent to the factories for capacity allocation.

Figure 1:
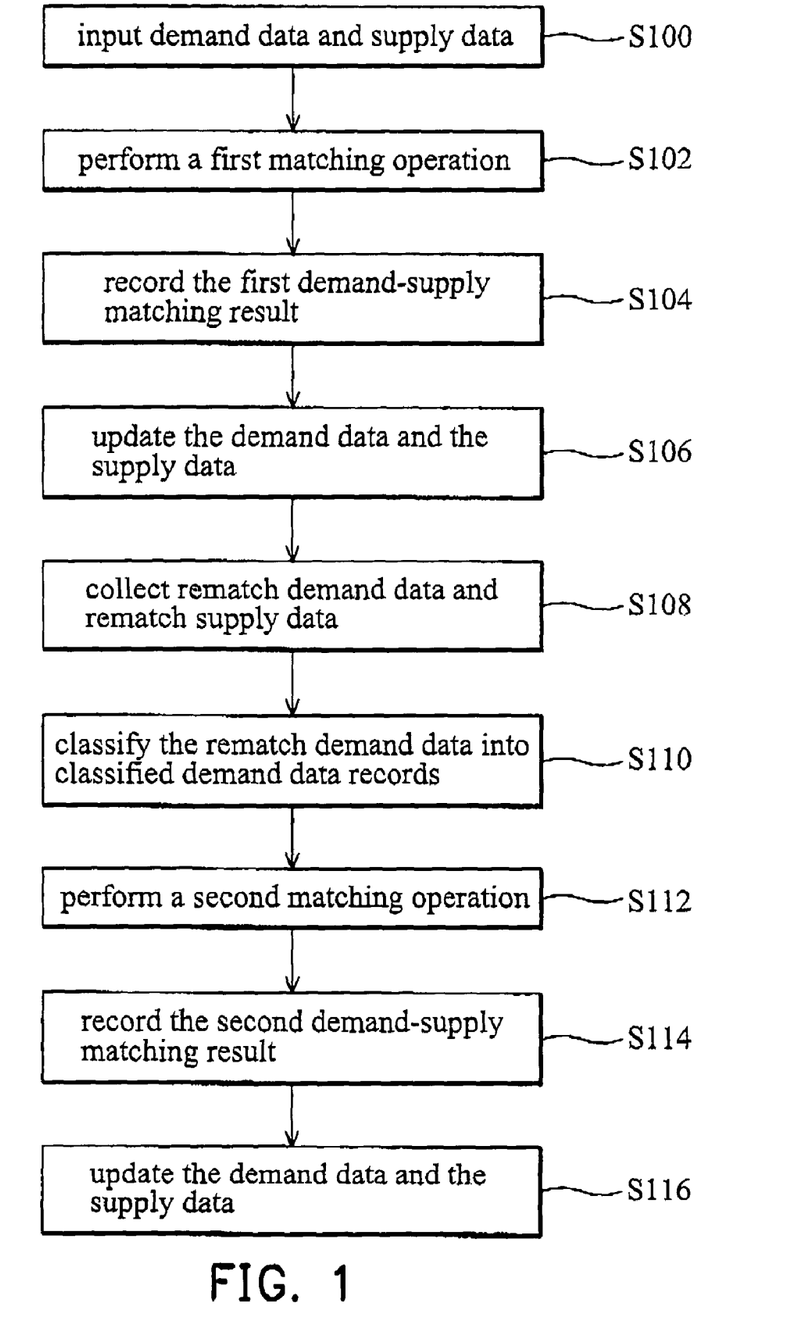
FIG. 1 is a flowchart of the computer-implemented method of matching customer demand with production capacity of a plurality of factory facilities.

FIG. 1 is a flowchart of the computer-implemented method of matching customer demand with production capacity of a plurality of factory facilities.

First, demand data for customers' product demand and supply data corresponding to the production capacity of the factory facilities are input (step S100).

Next, a first matching operation is performed to obtain a first demand-supply matching result (step S102). The first matching operation matches the demand data with the supply data directly. After the first demand-supply matching result is obtained, the first demand-supply matching result is recorded (step S104). The demand data and the supply data are updated according thereto (step S106). The demand data and supply data updates maintain the most current demand and supply data for further reference.

Rematched demand data and rematched supply data are collected (step S108). The rematched demand data is the unsatisfied demand and the rematched supply data is the unused capacity in the first matching operation.

The rematched demand data is then classified into classified demand data according to attributes of the corresponding products and customers (step S110). The classified demand data has different priorities. Attributes include new customers and new manufacturing processes of the product, existing customers and new manufacturing processes of the product, and existing customers and existing manufacturing processes of the product. In one embodiment, new customers and manufacturing processes are the highest priority, existing customers and new manufacturing processes are next priority, and existing customers and manufacturing processes are the lowest priority.

Finally, a second matching operation, matching the classified demand data with the rematched supply data based on the priorities of the classified demand data, is performed to obtain a second demand-supply matching result (step S112). The second demand-supply matching result is then recorded (step S114). The demand data and the supply data are then updated according to the second demand-supply matching result (step S116). Preferably, here the demand data and supply data updates maintain the most current demand and supply data for further reference.

As described above, after the second matching operation, each customer demand is accurately matched with the capacity. That is, the demand can be fulfilled and the supply can be utilized at the highest rate, satisfying customers and the manufacturer simultaneously. Moreover, the disclosed method requires a minimum of extra effort, such as computer programs, to accomplish this.

Figure 2:
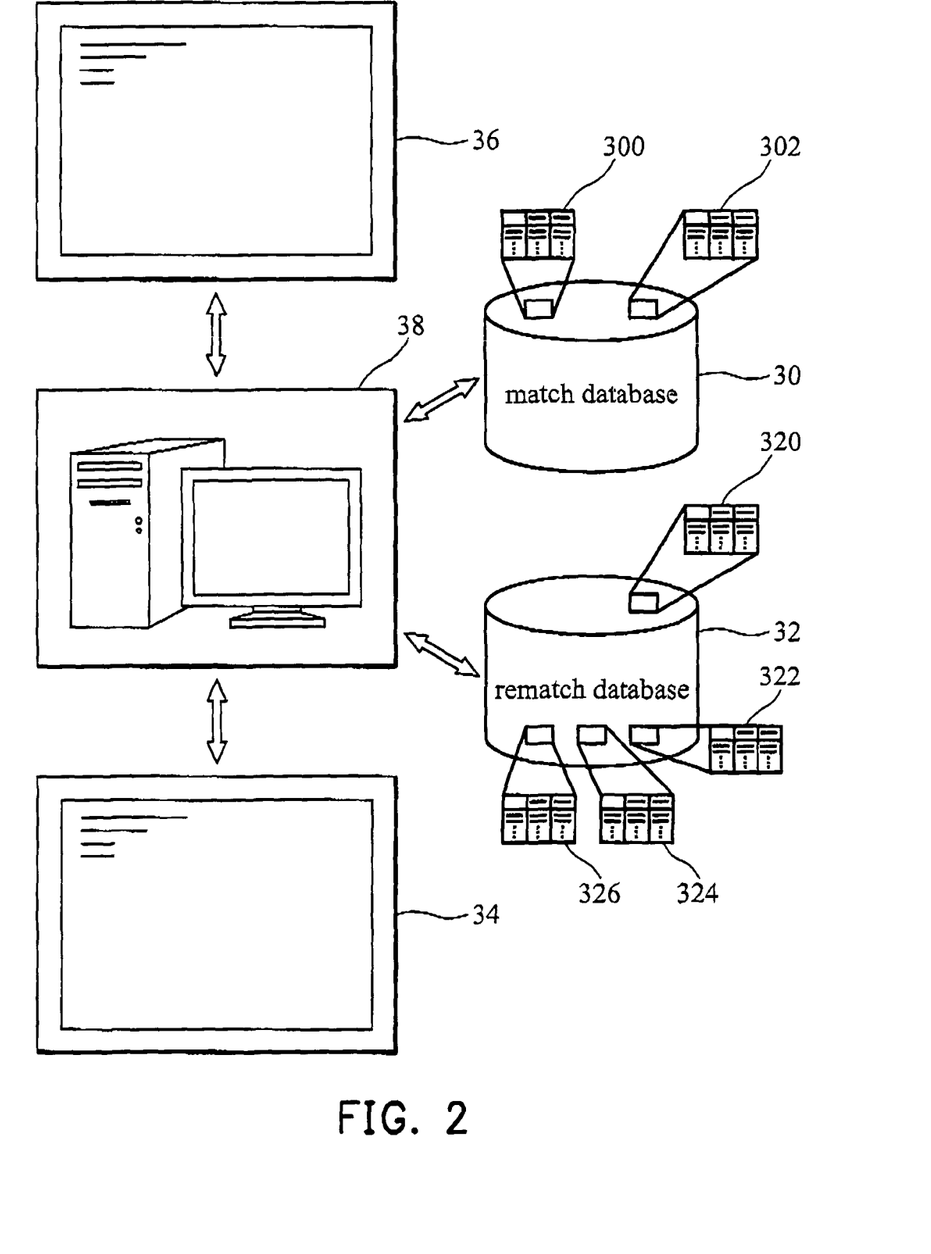
FIG. 2 is a diagram of the system for matching customer demand with production capacity of a plurality of factory facilities.

FIG. 2 is a diagram of an embodiment of a system for matching customer demand with production capacity of a plurality of factory facilities. The system includes a match database 30, a rematch database 32, a customer interface 34, a factory interface 36, and a controller computer 38.

Figure 3A:
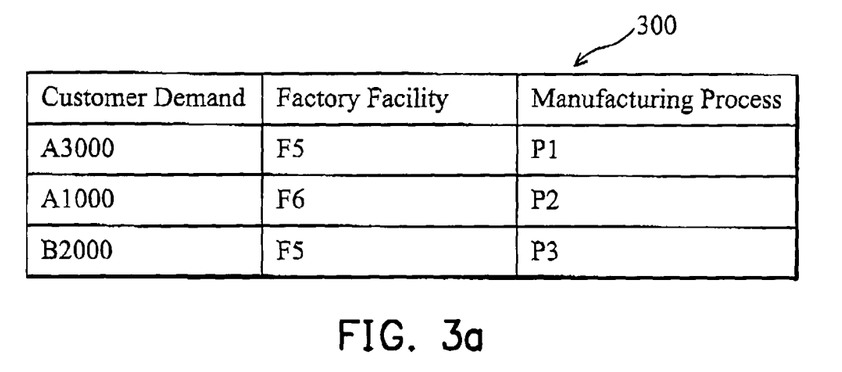
FIG. 3a to FIG. 3f are example tables.
Figure 3B:
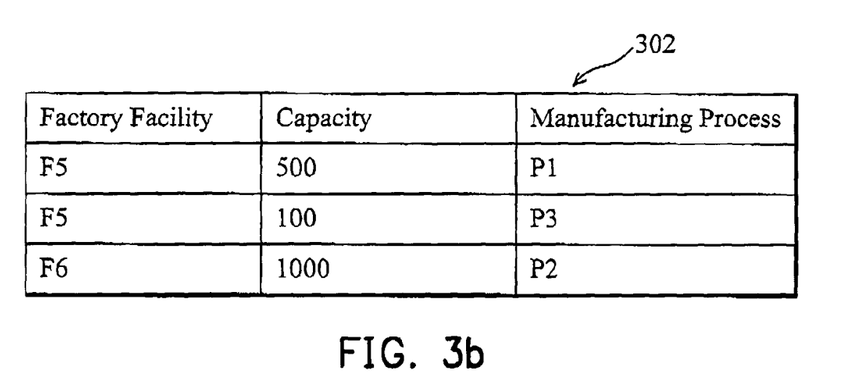
Figure 3C:
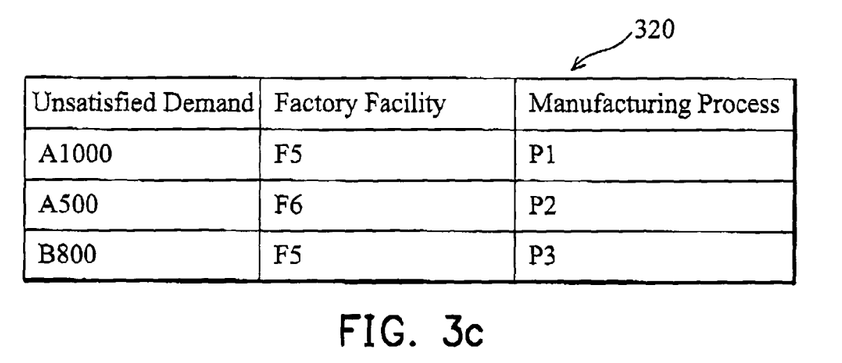
Figure 3D:
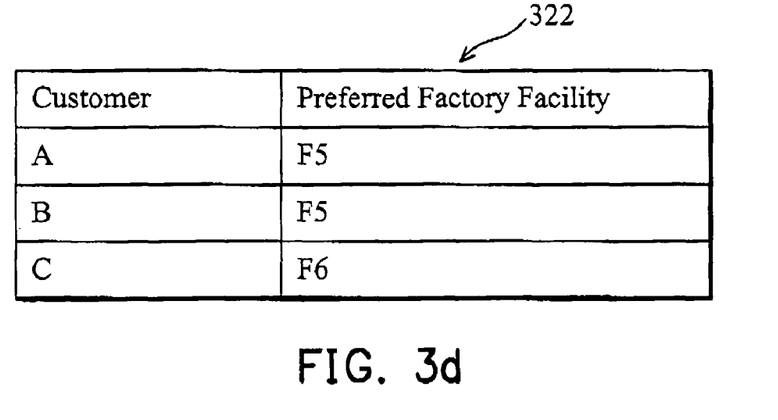
Figure 3E:
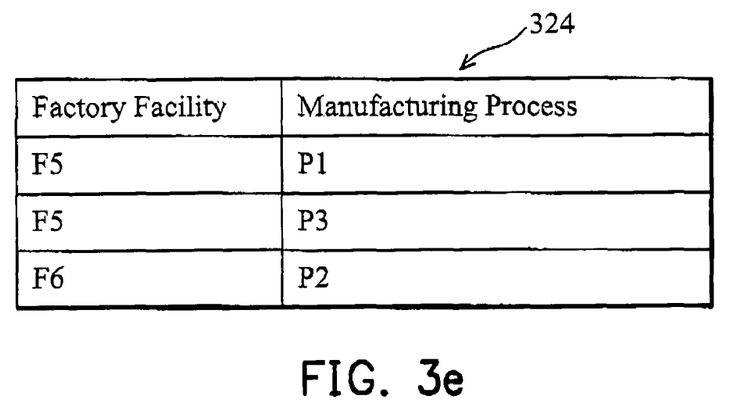
Figure 3F:
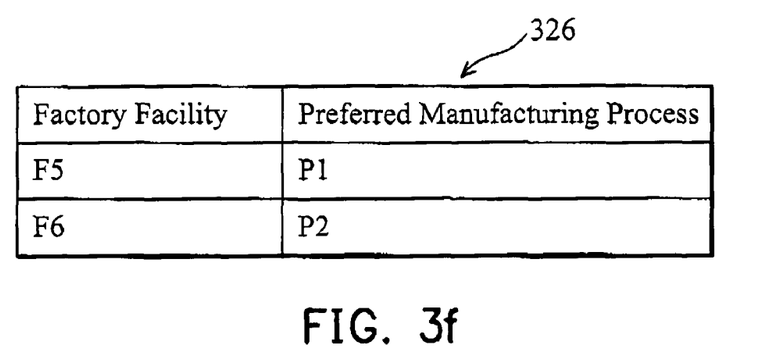

The match database 30 stores demand data and supply data. The demand data corresponds to customers' product demand and the supply data corresponds to the production capacity of the factory facilities. The rematch database 32 stores rematched demand data and rematched supply data. The demand data is preferably provided in a demand table 300. FIG. 3a is an example table of the demand table 300. The supply data is listed in a supply table 302. FIG. 3b shows an example of the supply table 302. The rematched demand data is listed in a rematched demand table 320. FIG. 3c is an example table of the rematched demand table. The rematched supply data is listed in supply tables, the rematched supply tables characterize the available factory facilities of the manufacturing processes, the manufacturer preferred factory facilities under cost consideration, the customer preferred factory facilities. For example, the rematched supply tables include a first rematched supply table 322, a second rematched supply table 324, and a third rematched supply table 326. FIG. 3d, FIG. 3e and FIG. 3f are example tables of the first rematched supply table 322, the second rematched supply table 324, and the third rematched supply table 326.

The customer interface 34 enables input of the demand data, such as a computer user interface with some tables. Customers can also utilize the customer interface 34 to trace demand processing status, such as allocation status. The factory interface 36 enables input of supply data, such as a computer user interface with some tables. The factory interface 36 is usually utilized by managers of the factory facilities to input capacity related information.

The controller computer 38 is coupled to the match database 30, the rematch database 32, the customer interface 34, and the factory interface 36. The controller computer 38 performs a first matching operation, collects the rematched demand data and the rematched supply data, classifies the rematched demand data into classified demand data, and performs a second matching operation.

The first matching operation matches the demand data with the supply data to obtain a first demand-supply matching result. After the first demand-supply matching result is obtained, the controller computer 38 then collects rematched demand data, corresponding to a portion of the demand unsatisfied in the first matching operation from the demand data, and the rematched supply data, corresponding to a portion of the unused capacity in the first matching operation from the supply data.

The rematched demand data is classified into classified demand data by the controller computer 38 according to attributes of the corresponding products and customers. The classified demand data has different priorities. The controller computer 38 performs a second matching operation to match the classified demand data with the rematched supply data based on the priorities of the classified demand data to obtain a second demand-supply matching result.

After the second matching operation, each demand is accurately matched with the supply. If the customer is still not satisfied with the result, the demand can be terminated or a new demand requested.

Figure 4:
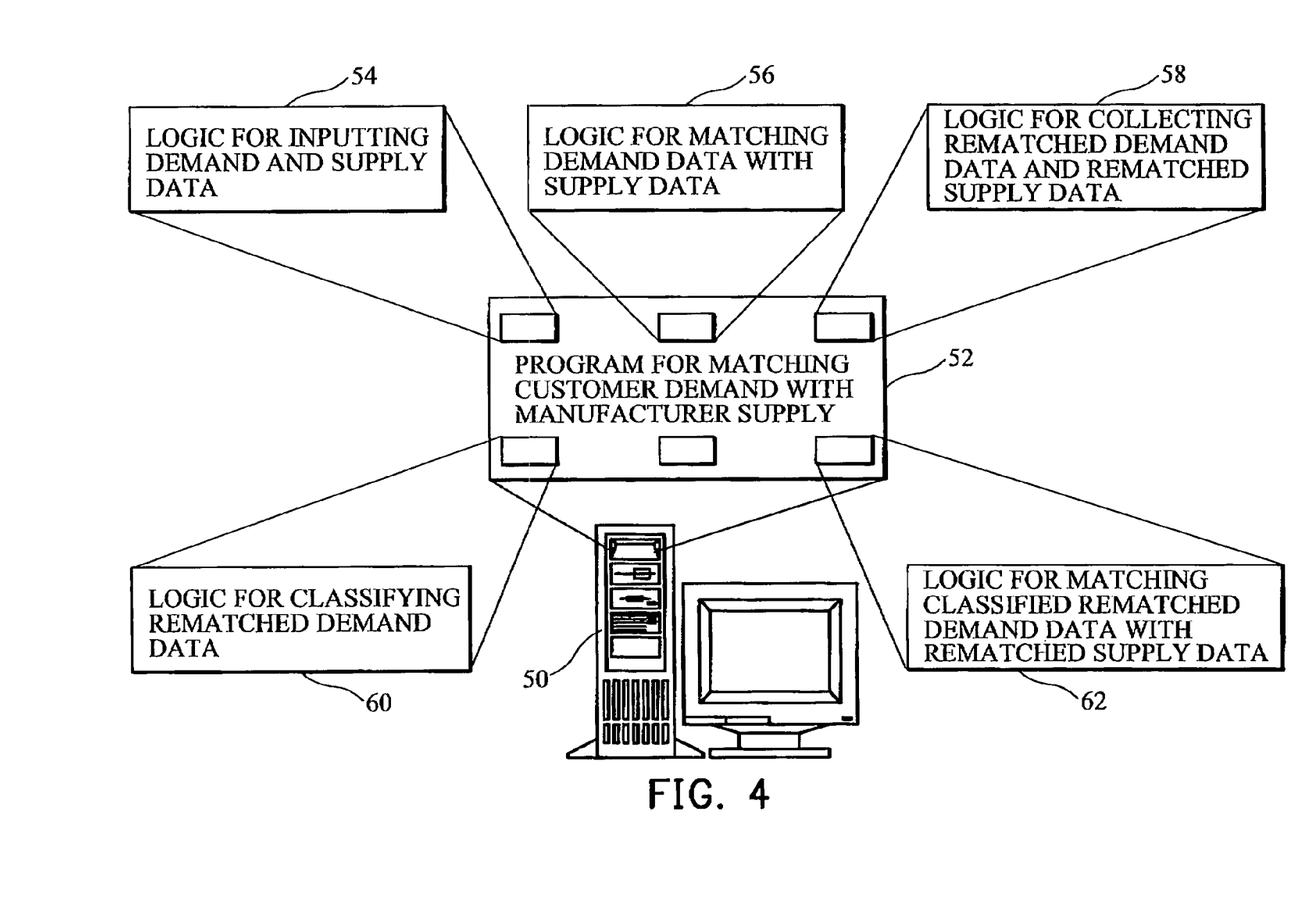
FIG. 4 is a diagram of the storage medium for storing a computer program providing a method of matching customer demand with a manufacturer's supply of a product from a plurality of factory facilities.

FIG. 4 is a diagram of the storage medium for storing a computer program providing a method of matching customer demand with a manufacturer supply of a product from a plurality of factory facilities. The storage medium 50 stores a computer program 52. The computer program 52 provides a method of matching customer demand with a manufacturer's supply of a product from a plurality of factory facilities. The program mainly includes logic for inputting demand and supply data 54, logic for matching demand data with supply data 56, logic for collecting rematched demand and rematched supply data 58, logic for classifying rematched demand 60, and logic for matching rematched demand and supply data 62.

Thus, a method of matching customer demand with production capacity of a plurality of factory facilities is provided by the invention. The disclosed method utilizes data collection from different phases to solve the demand-supply mismatching problem. The inventive method is specifically useful in high technology-related fields, such as an IC manufacturer, presenting significant advantages in mutual satisfaction for customers and manufacturers.

It will be appreciated from the foregoing description that the system and method described herein provide a dynamic and robust solution to the demand-supply mismatch problem. If, for example, a customer cancels an order (cancel a demand order), the system and method of the present invention can revise the demand-supply relationship model.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer-implemented method of matching customer demand with a manufacturer supply of products from plurality of factory facilities, comprising using a computer to perform the steps of:
   inputting demand data, using the computer, for a demand of at least one product requested by at least one customer and supply data corresponding to a production capacity of the factory facilities;
   performing a first matching operation, using the computer, to match the demand data with the supply data to obtain a first demand-supply matching result;
   collecting rematched demand data, using the computer, corresponding to a portion of the demand unsatisfied by the first matching operation from the demand data and collecting rematched supply data corresponding to a portion of the production capacity unused in the first matching operation from the supply data;
   classifying the rematched demand data, using the computer, into a plurality of classified demand data records according to at least one attribute of the at least one product and the at least one customer corresponding thereto, the classified demand data having different priorities wherein new customers and manufacturing processes are highest priority, existing customers and new manufacturing processes are next priority, and existing customers and manufacturing processes are lowest priority; and
   performing a second matching operation, using the computer, to match the classified demand data with the rematched supply data based on the priorities of the classified demand data to obtain a second demand-supply matching result.

2. The computer-implemented method as claimed in claim 1, wherein the first matching operation step further comprises the steps of:
recording the first demand-supply matching result; and
updating the demand data and the supply data according to the first demand-supply matching result.

3. The computer-implemented method as claimed in claim 1, wherein the second matching operation step further comprises the steps of:
recording the second demand-supply matching result; and
updating the demand data and the supply data according to the second demand-supply matching result.

4. The computer-implemented method as claimed in claim 1, wherein the demand data is defined by creating a demand table, the demand table characterizing the relationship between customer demand, the factory facilities, and manufacturing processes for the product as provided thereby.

5. The computer-implemented method as claimed in claim 1, wherein the supply data is defined by creating a supply table, the supply table characterizing the relationship between the factory facilities, the capacity and manufacturing processes provided by the factory facilities.

6. The computer-implemented method as claimed in claim 1, wherein the rematched demand data is defined by creating a rematched demand table that characterizes the relationship between unsatisfied demand, the factory facilities, and manufacturing processes for the product as provided thereby.

7. The computer-implemented method as claimed in claim 1, wherein the rematched supply data is defined by creating a plurality of rematched supply tables, the rematched supply tables characterizing the available factory facilities of the manufacturing processes, the manufacturer preferred factory facilities under cost consideration, and the customer preferred factory facilities.

8. The computer-implemented method as claimed in claim 1, wherein the attributes of the corresponding products and customers are new customers and manufacturing processes of the product, existing customers and new manufacturing processes of the product, and existing customers and manufacturing processes of the product.

9. A storage medium for storing a computer program providing a method of matching customer demand with a manufacturer supply of a product from a plurality of factory facilities, the method comprising the steps of:
inputting demand data for a demand of at least one product requested by at least one customer and supply data corresponding to a production capacity of the factory facilities;
performing a first matching operation to match the demand data with the supply data to obtain a first demand-supply matching result;
collecting rematched demand data corresponding to a portion of the demand unsatisfied in the first matching operation from the demand data and collecting rematched supply data corresponding to a portion of the production capacity unused in the first matching operation from the supply data;
classifying the rematched demand data into a plurality of classified demand data records according to attributes of the at least one product and the at least one customer corresponding thereto, the classified demand data having different priorities; and
performing a second matching operation to match the classified demand data with the rematched supply data based on the priorities of the classified demand data to obtain a second demand-supply matching result.

10. The storage medium as claimed in claim 9, wherein the first matching operation step further comprises the steps of:
recording the first demand-supply matching result; and
updating the demand data and the supply data according to the first demand-supply matching result.

11. The storage medium as claimed in claim 9, wherein the second matching operation step further comprises the steps of:
recording the second demand-supply matching result; and
updating the demand data and the supply data according to the second demand-supply matching result.

12. The storage medium as claimed in claim 9, wherein the demand data is defined by creating a demand table, the demand table characterizing the relationship between customer demand, the factory facilities, and manufacturing processes for the product as provided thereby.

13. The storage medium as claimed in claim 9, wherein the supply data is defined by creating a supply table, the supply table characterizing the relationship between the factory facilities, the capacity and manufacturing processes for the product as provided by the factory facilities.

14. The storage medium as claimed in claim 9, wherein the rematched demand data is defined by creating a rematched demand table that characterizes the relationship between unsatisfied demand, the factory facilities, and manufacturing processes for the product as provided thereby.

15. The storage medium as claimed in claim 9, wherein the rematched supply data is defined by creating a plurality of rematched supply tables, the rematched supply tables characterizing the available factory facilities of the manufacturing processes, the manufacturer preferred factory facilities under cost consideration, and the customer preferred factory facilities.

16. The storage medium as claimed in claim 9, wherein the attributes of the corresponding products and customers are new customers and manufacturing processes of the product, existing customers and new manufacturing processes of the product, and existing customers and manufacturing processes of the product.

17. A system for matching customer demand with a manufacturer supply of a product from a plurality of factory facilities, comprising:
a match database, storing demand data for a demand of at least one product requested by at least one customer and supply data corresponding to a production capacity of the factory facilities;
a rematch database, storing rematched demand data and rematched supply data;
a customer interface, enabling input of the demand data;
a factory interface, enabling input of the supply data; and
a controller computer, coupled to the match database, the rematch database, the customer interface, and the factory interface, performing a first matching operation to match the demand data with the supply data to obtain a first demand-supply matching result, collecting rematched demand data corresponding to a portion of the demand unsatisfied in the first matching operation from the demand data and collecting rematched supply data corresponding to a portion of the production capacity unused in the first matching operation from the supply data, classifying the rematched demand data into a plurality of classified demand data records according to attributes of the at least one product and the at least one customer corresponding thereto, the classified demand data having different priorities, and performing a second matching operation to match the classified demand data with the rematched supply data based on the priorities of the classified demand data to obtain a second demand-supply matching result.

18. The system as claimed in claim 17, wherein the controller computer further records the first demand-supply matching result, and updating the demand data and the supply data according to the first demand-supply matching result after the first matching operation.

19. The system as claimed in claim 17, wherein the controller computer further records the second demand-supply matching result, and updating the demand data and the supply data according to the second demand-supply matching result after the second matching operation.

20. The system as claimed in claim 17, wherein the demand data is defined by creating a demand table, the demand table characterizing the relationship between customer demand, the factory facilities, and manufacturing processes for the product as provided thereby.

21. The system as claimed in claim 17, wherein the supply data is defined by creating a supply table, the supply table characterizing the relationship between the factory facilities, the capacity and manufacturing processes for the product as provided by the factory facilities.

22. The system as claimed in claim 17, wherein the rematched demand data is defined by creating a rematched demand table that characterizes the relationship between unsatisfied demand, the factory facilities, and manufacturing processes for the product as provided thereby.

23. The system as claimed in claim 17, wherein the rematched supply data is defined by creating a plurality of rematched supply tables, the rematched supply tables characterizing the available factory facilities of the manufacturing processes, the manufacturer preferred factory facilities under cost consideration, and the customer preferred factory facilities.

24. The system as claimed in claim 17, wherein the attribute of the corresponding products and customers are new customers and manufacturing processes of the product, existing customers and new manufacturing processes of the product, and existing customers and manufacturing processes of the product.

25. A system of demand and capacity management, comprising:
an allocation planning module to receive demand data for a demand of at least one product requested by at least one customer and supply data corresponding to production capacity of factory facilities;
a capacity model having route information for the product, wherein the route information records a plurality of tools; and
a capacity management module to reserve capacity according to the demand data and the route information.

26. The system as claimed in claim 25, wherein the allocation planning module further comprises:
a data input module, inputting the demand data the supply data;
a first match module, performing a first matching operation to match the demand data with the supply data to obtain a first demand-supply matching result;
a rematch data collection module, collecting rematched demand data corresponding to a portion of the demand unsatisfied in the first matching operation from the demand data and collecting rematched supply data corresponding to a portion of the unused capacity in the first matching operation from the supply data;
a classification module, classifying the rematched demand data into a plurality of classified demand data records according to attributes of the corresponding products and customers, the classified demand data having different priorities; and
a second match module, performing a second matching operation to match the classified demand data with the rematched supply data based on the priorities of the classified demand data to obtain a second demand-supply matching result.

27. The system as claimed in claim 26, wherein the first match module further comprises:
a first record module, recording the first demand-supply matching result; and
a first update module, updating the demand data and the supply data according to the first demand-supply matching result.

28. The system as claimed in claim 26, wherein the second match module further comprises:
a second record module, recording the second demand-supply matching result; and
a second update module, updating the demand data and the supply data according to the second demand-supply matching result.

29. The system as claimed in claim 26, wherein the demand data is defined by creating a demand table, the demand table characterizing the relationship between customer demand, the factory facilities, and manufacturing processes provided by the factory facilities.

30. The system as claimed in claim 26, wherein the supply data is defined by creating a supply table, the supply table characterizing the relationship between the factory facilities, the capacity and manufacturing processes for the product as provided by the factory facilities.

31. The system as claimed in claim 26, wherein the rematched demand data is defined by creating a rematched demand table that characterizes the relationship between unsatisfied demand, the factory facilities, and manufacturing processes for the product as provided thereby.

32. The system as claimed in claim 26, wherein the rematched supply data is defined by creating a plurality of rematched supply tables, the rematched supply tables characterizing the available factory facilities of the manufacturing processes, the manufacturer preferred factory facilities under cost consideration, and the customer preferred factory facilities.

33. The system as claimed in claim 26, wherein the attribute of the corresponding products and customers are new customers and manufacturing processes of the product, existing customers and new manufacturing processes of the product, and existing customers and manufacturing processes of the product.

* * * * *